(12) United States Patent
Teijeiro Castro et al.

(10) Patent No.: US 8,870,202 B2
(45) Date of Patent: Oct. 28, 2014

(54) STABILIZER FOR VEHICLE SUSPENSION

(71) Applicant: Edai Technical Unit, A.I.E., Amorebieta (ES)

(72) Inventors: Rafael Teijeiro Castro, Amorebieta (ES); Jorge Varela, Amorebieta (ES); Joserra Mosteiro, Amorebieta (ES)

(73) Assignee: Edai Technical Unit, A.I.E., Amorebieta (ES)

( * ) Notice: Subject to any disclaimer, the term of this patent is extended or adjusted under 35 U.S.C. 154(b) by 0 days.

(21) Appl. No.: 13/953,657

(22) Filed: Jul. 29, 2013

(65) Prior Publication Data
US 2014/0035249 A1    Feb. 6, 2014

(30) Foreign Application Priority Data
Jul. 27, 2012  (EP) ..................................... 12382305

(51) Int. Cl.
*B60G 21/055*  (2006.01)
*B60G 21/00*   (2006.01)

(52) U.S. Cl.
CPC .......... *B60G 21/005* (2013.01); *B60G 21/0551* (2013.01); *B60G 2204/1224* (2013.01); *B60G 2206/11* (2013.01)
USPC ...... 280/124.106; 280/124.101; 280/124.107; 280/124.116; 280/124.134; 280/124.152

(58) Field of Classification Search
USPC .................... 280/124.101, 124.106, 124.107, 280/124.152, 124.111, 124.116, 124.134, 280/104
See application file for complete search history.

(56) References Cited

U.S. PATENT DOCUMENTS

| | | | |
|---|---|---|---|
| 1,817,529 A | | 8/1931 | Skillman |
| 4,750,885 A | * | 6/1988 | Ito .................................. 403/135 |
| 5,165,306 A | * | 11/1992 | Hellon ............................ 74/588 |
| 5,720,833 A | * | 2/1998 | Grube et al. ................. 156/73.1 |
| 6,030,570 A | | 2/2000 | McLaughlin |
| 7,032,624 B2 | * | 4/2006 | Bruske et al. .................... 139/57 |
| 2007/0069496 A1 | * | 3/2007 | Rinehart et al. ....... 280/124.166 |
| 2007/0194549 A1 | * | 8/2007 | Germano et al. ...... 280/124.107 |
| 2011/0089658 A1 | * | 4/2011 | Buhl et al. ............. 280/124.106 |
| 2011/0133425 A1 | * | 6/2011 | Jeong ..................... 280/124.134 |

FOREIGN PATENT DOCUMENTS

| EP | 0479598 A2 | 4/1992 |
|---|---|---|
| FR | 2835024 A1 | 7/2003 |

OTHER PUBLICATIONS

EP Application No. 12382305 Search Report dated Nov. 28, 2012.

* cited by examiner

*Primary Examiner* — Paul N Dickson
*Assistant Examiner* — Darlene P Condra
(74) *Attorney, Agent, or Firm* — Kunzler Law Group, PC

(57) ABSTRACT

The present disclosure relates to a stabilizer for vehicle suspension, comprising a longitudinal polymeric body with a metal frame having two ends (3) and a central sector (2), having a hole (4) at each end (3) wherein there is housed a ball joint (7), where the frame is formed from two metal parts (1) having an open section which are arranged opposite one another on their open sides, the central sector (2) of each part (1) comprising two tabs (6) located in opposition on each side and facing the open side, and the ends (3) comprising rims (3') such that the two opposing parts (1) rest on the tabs (6) and on the rims (3') and are embedded in an overmolded body (5) which externally coats them and fills the inner space defined by the two opposing metal parts (1).

13 Claims, 12 Drawing Sheets

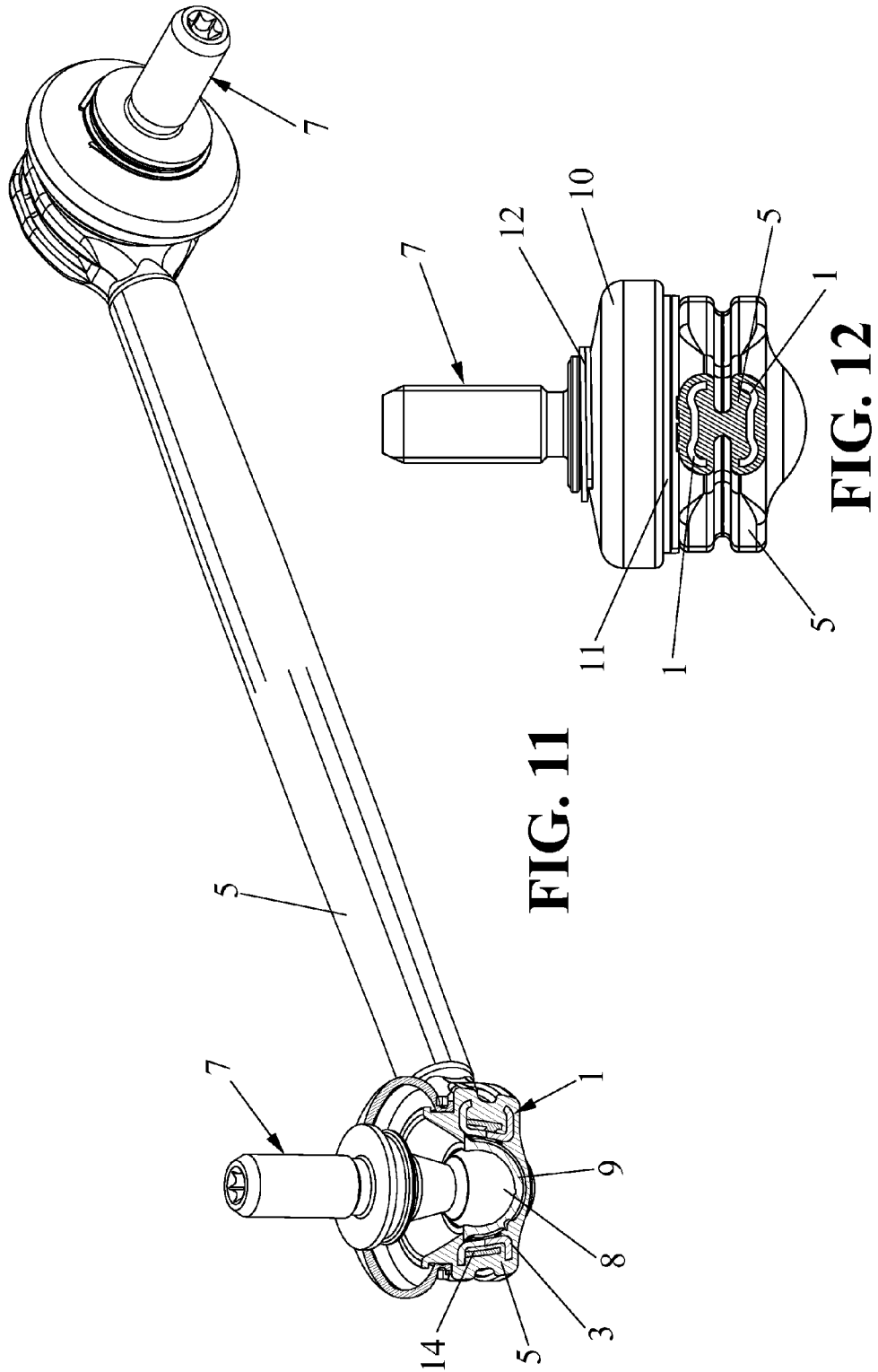

STABILIZER FOR VEHICLE SUSPENSION

FIELD

The present disclosure relates to a stabilizer for vehicle suspension that can be applied in the area of the component industry for the automotive vehicle industry.

BACKGROUND

Suspension systems for automotive vehicles comprise stabilizers that are arranged between the vehicle chassis and the suspension of each wheel. These stabilizers are usually formed by a cylindrical element which incorporates respective housings at its ends for assembling joints, typically ball or elastic joints.

The stabilizer is a part which joins the stabilizer bar with the suspension of the wheel. Stabilizers belong to the kinematic chain usually formed by the stabilizer bar, stabilizer, suspension, and vehicle chassis. The stabilizer is the element responsible for transmitting the stresses generated by the stabilizer bar to the suspension of the wheel, and vice versa, generating a moment in the vehicle chassis that is contrary to the vehicle's roll moment, achieving greater lateral rigidity of the vehicle.

When a vehicle starts going around a curve, a centrifugal force causing the car body to tilt towards the outside of said curve, is generated, creating a roll moment. The stabilizer bar attached to the suspension of the wheel by means of the stabilizer in turn experiences torsion causing a moment opposite the vehicle's roll moment.

As explained above, the function of the stabilizer is to transmit the stresses generated by the stabilizer bar to the suspension of the wheel, and vice versa. This element consists of two articulations attached by means of a longitudinal body. The articulations can be ball joints or elastic joints. One of the articulations is in turn attached to the stabilizer or torsion bar and the other articulation is attached to the vehicle's shock absorber, also being able to be anchored to any other element of the suspension instead of to the shock absorber, for example to a suspension arm.

The stabilizer is made up of a usually metal or polymeric body with two kinematic centers at its ends which are the center of rotation of the articulations located at said ends. These articulations can be either ball or elastic joints.

If they are ball joints, an intermediate part is arranged between the ball joint and the body referred to as a seat, the function of which is to assure the positioning of the ball joint in the kinematic center, allow transferring stresses from, the ball joint to the body and allow the rotation of the ball joint with respect to the body. The seat is integrally attached to the body, so there is relative movement between the ball joint and the remaining components described up until now.

The ball joint has the function of generating three rotational degrees of freedom and attaching the assembly of the stabilizer to the stabilizer bar or to the shock absorber of the automotive vehicle. In addition to these two functions, there is a third function which is assuring the leak-tightness inside the articulation. This latter function also exists in the body of the stabilizer, because it is in these two components where the dust seal or bellows is anchored by means of the rings.

In the case of an elastic joint with 6 degrees of freedom, the articulation is integrally attached to the body of the stabilizer at one end and at the other end to the stabilizer bar or to the shock absorber of the automotive vehicle.

There are different types of stabilizers on the market which have different configurations according to each specific application. These elements usually have a series of requirements in common among them, particularly having a specific rigidity, weighing as little as possible, allowing the fastest assembly possible and costing as little as possible.

There are steel stabilizers characterized by being very heavy and having little resistances to corrosion, coating the body being necessary. An advantage of such stabilizers is their high rigidity.

There are also aluminum stabilizers characterized by weighing less than those mentioned above but having less rigidity.

Finally, there are plastic stabilizers which are characterized by weighing less and being more economical; however these plastic stabilizers require a larger volume to have a rigidity equivalent to those mentioned above.

SUMMARY

The present disclosure relates to a stabilizer defined in claim 1.

The stabilizer of the disclosure is a longitudinal element with two ball joints at the ends. This element has two kinematic points at its ends which are the centers of articulation. The line joining the two kinematic centers is called "longitudinal axis". It should be known that the longitudinal axis coincides with the main axis of inertia in the intermediate sections of the body to thereby homogenously distribute the traction-compression loads throughout the entire section.

The present disclosure focuses on the body which is responsible for physically attaching both articulations in a manner that is resistant so as to withstand the loads applied in the ball joints.

For the purpose of reducing weight and volume, a polymeric body with a metal frame is proposed to reach a compromise between both variables. Said frame is partially or completely coated with the polymer, and the frame will consist of one or several metal parts.

The axes of the articulations positioned at the ends of the body can be parallel to or form an angle with one another. The area corresponding to the spherical joints is where the contact between metal parts for assuring the correct positioning of both metal parts, which are assembled opposing one another, takes place. They form the metal frame once they are positioned. Next the ball joint is introduced in the seat and the assembly is positioned such that the kinematic center of the spherical joint coincides with the longitudinal axis of inertia of the part. The metal frame together with the ball joint and seat assembly are overmolded once the entire assembly is positioned such that the frame is completely embedded. Two cavities are left for each of the articulations, and the size of said cavities will depend on the roll angle of the articulation, the larger the angle the larger the opening. The geometry of the section of the central area of the body can be H- or I-shaped, which is divided into two flanges and a web. It is also contemplated that the section of the central area of the body is square, circular or has any geometry that progressively transitions from one to another.

The advantages of this disclosure with respect to a polymeric body are that the volume is reduced maintaining resistance and rigidity is increased maintaining volume. The advantages with respect to a metal body are that weight is reduced maintaining resistance.

It is also contemplated that the frame is completely internal or partially external and that it is formed by one or several metal parts.

Specifically, the frame depicted in the drawings consists of two equal metal parts opposing one another and coated with a plastic body that is overmolded entirely on the frame.

The stabilizer object of the disclosure seeks to obtain a plastic stabilizer internally comprising a metal body or frame on which a polymer is overmolded. A plastic stabilizer taking up less volume than conventional stabilizers but having high rigidity and resistance, while at the same time minimizing material and weight, giving it better mechanical properties, is thereby obtained. The disclosure describes an optimal solution given that an intermediate design between a stabilizer with a metal body which weighs more and a stabilizer with a polymeric body which has a larger volume is achieved. It should further be pointed out that compared with an aluminum stabilizer in the same weight and volume conditions, the cost is lower in the case of the subject matter of the present disclosure.

In summary, the stabilizer of the disclosure comprises a metal frame or body formed by two metal parts. Each of the parts has two holes or elongated holes and two tabs or flaps. The flow of polymer material injected into the frame is facilitated through the holes. Once the polymer material is overmolded on the metal frame, a portion of that polymer material is housed in the central sector between the holes of both metal parts acting like a clamp and assuring that both sheets move integrally with one another.

Although in one embodiment of the disclosure the polymer completely embeds the body or frame which is formed by two metal parts, other constructive possibilities are also contemplated. In this sense, the frame can be formed by at least one metal part and be partially covered or embedded in the polymer.

The main features of the disclosure are the improved weight feature, trying to minimize this parameter. At the same time, the metal parts of the frame allow greatly improving the mechanical characteristics of the part, increasing its rigidity. If this design is compared with conventional designs of the current state of the art, the following applies:

Compared to stabilizers having a metal body, the stabilizer of the disclosure weighs less, has greater corrosion resistance and surface coatings to protect the body are not necessary, i.e., weight is reduced maintaining resistance.

Compared to aluminum stabilizers, the fundamental advantage is the rigidity and price, i.e., costs are reduced maintaining weight and volume.

Compared to conventional stabilizers made of a polymer material, the subject matter of the disclosure takes up much less volume for a similar weight. The mechanical characteristics are better in the case of the stabilizer of the disclosure, in summary, volume is reduced maintaining resistance, and rigidity is increased maintaining volume.

In addition to that discussed in the preceding paragraph, the following advantages can be considered:

1. The price, weight and volume are minimized, and in contrast the rigidity is increased.

2. With respect to the environment, surface coatings for protecting the steel frameworks from corrosion are not necessary. The plastic body of the assembly protects against corrosion given that the frame is completely inside and is completely coated with a polymer.

3. It is a closed profile, so dirt cannot accumulate inside the profile, as could be possible in other designs.

4. This same closed profile feature helps to prevent the stabilizer from being able to make noises. If an open part is considered, the wind can get between the two shells forming the body of the stabilizer while driving the vehicle, generating noises and discomfort for the driver of the vehicle.

5. The frame is formed by two preferably identical metal parts opposing one another, with the subsequent cost and stock reduction this entails.

Incorporating the tabs in the central area of the metal part has the function of strengthening said central area. By modifying the height and width of the mentioned tabs, the rigidity of the body can thus be varied, being able to modify the collapsing area of the part at will.

The presence of opposing tabs in the metal frame further allows attaching both metal parts to one another by welding or by any other means of attaching metal parts. All this favors performance under compression, which is the most unfavorable case for the central area of the part, increasing its capacity with respect to such stresses.

The methods for producing the subject matter of the disclosure include overmolding the entire part all at once; overmolding the part in two halves, the head plus half the body and the other head plus the other half in a second step; or overmolding the two heads at the same time and the central portion of the body in a second phase. Another option is to produce a single head, the other head in another injection and the body in a third injection.

Other secondary aspects of the disclosure are defined in the dependent claims.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

DESCRIPTION OF THE DRAWINGS

To complement the description that is being made and for the purpose of aiding to better understand the features of the subject matter of the present disclosure according to a preferred practical embodiment therefore, a set of drawings is attached as an integral part of said description in which the following has been depicted with an illustrative and non-limiting character:

FIG. 11 shows a perspective view partially sectioned in one of the ball joints, where the coupling between a ball joint and the stabilizer of the disclosure is depicted, including the overmolded body, the arrangement of the ball joint in the stabilizer of the disclosure, as well as a ring bracing the end that has been depicted partially sectioned, being seen.

FIG. 12 shows a cross-section view of an embodiment of the stabilizer of the disclosure along its central sector, in an area different from that of the tabs and including the ball joint, where the configuration of the metal parts can be seen.

DETAILED DESCRIPTION

Figure 1:
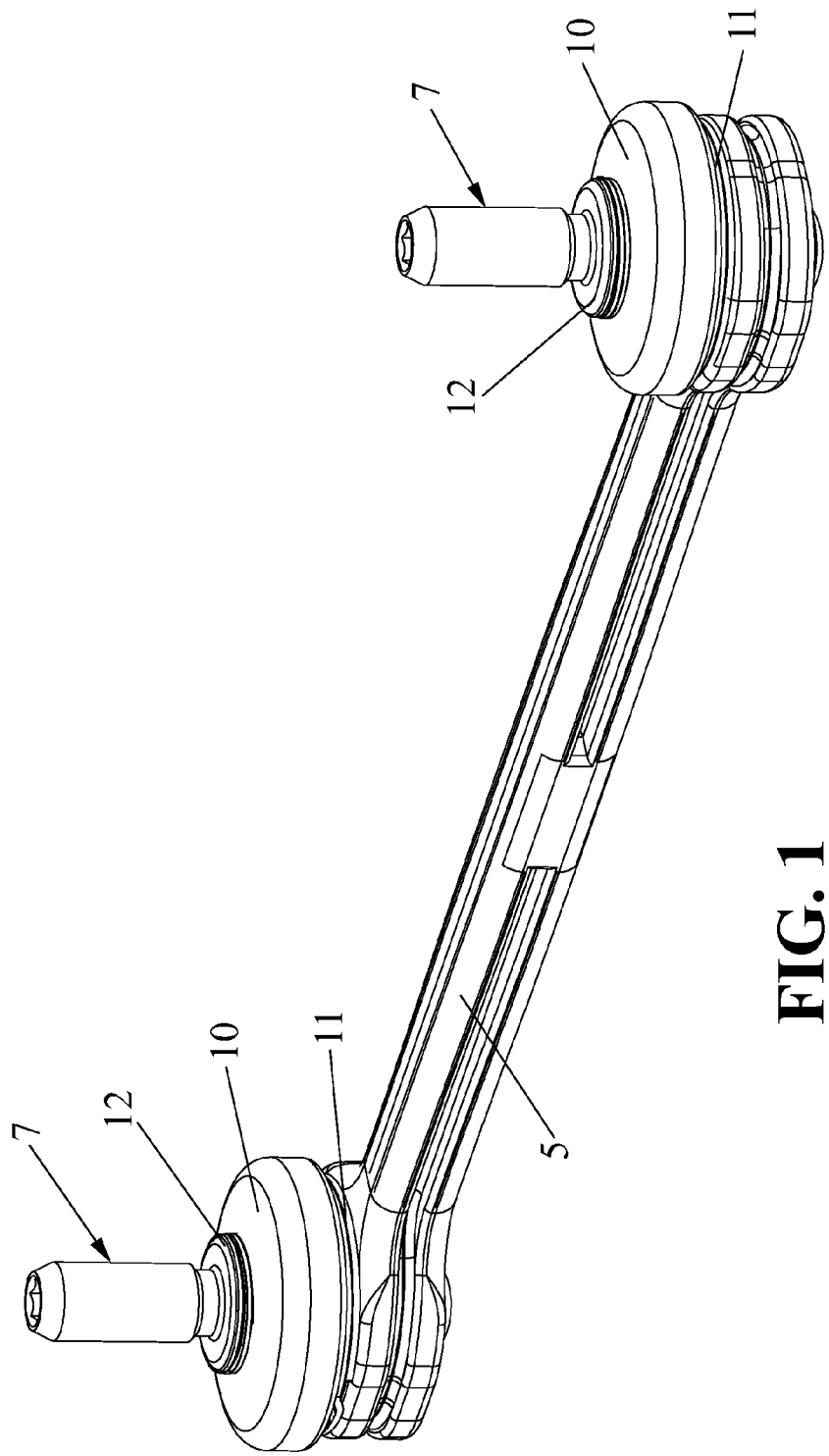
FIG. 1 shows a perspective view of a preferred embodiment of the stabilizer of the disclosure.
Figure 2:
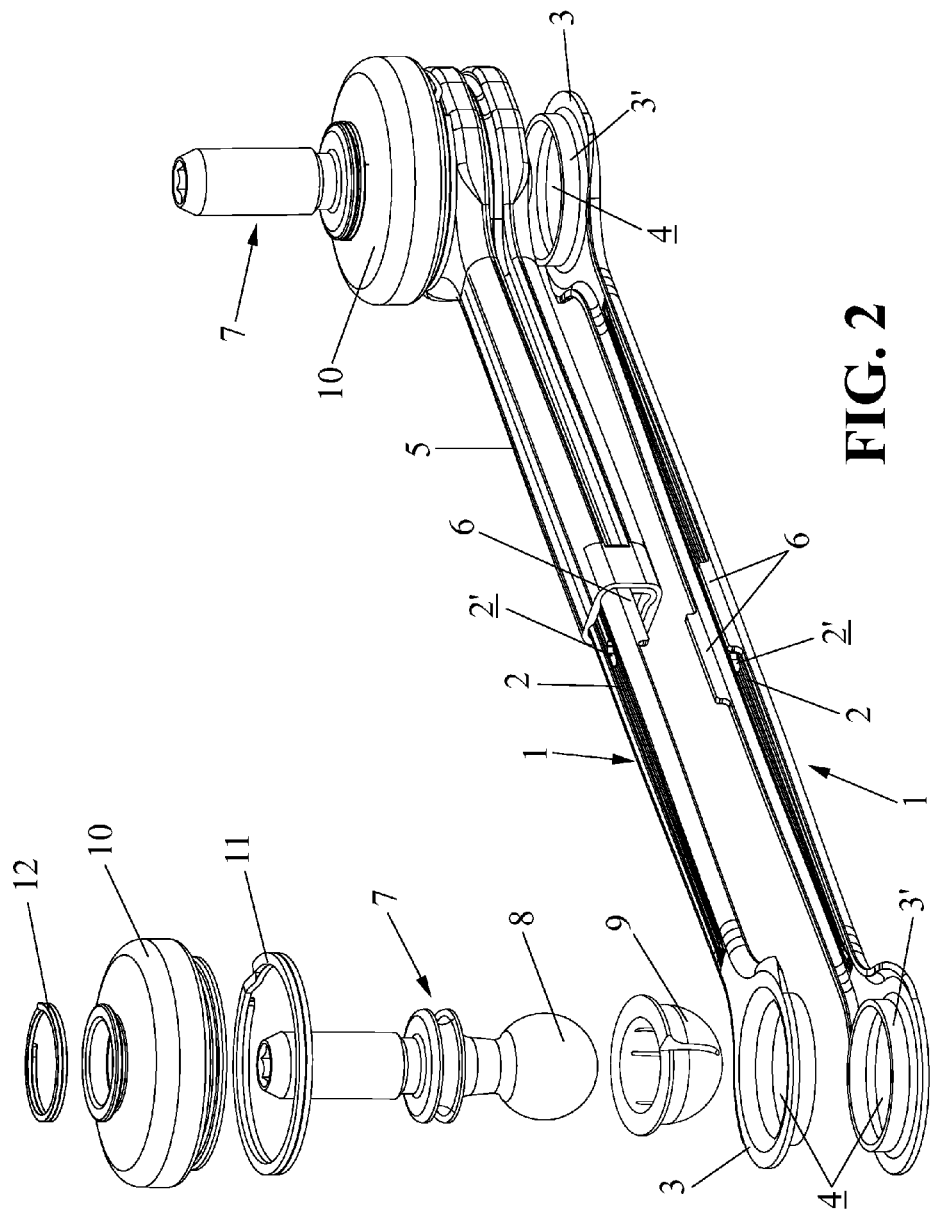
FIG. 2 shows an exploded perspective view of a preferred embodiment of the stabilizer of the disclosure.
Figure 3:
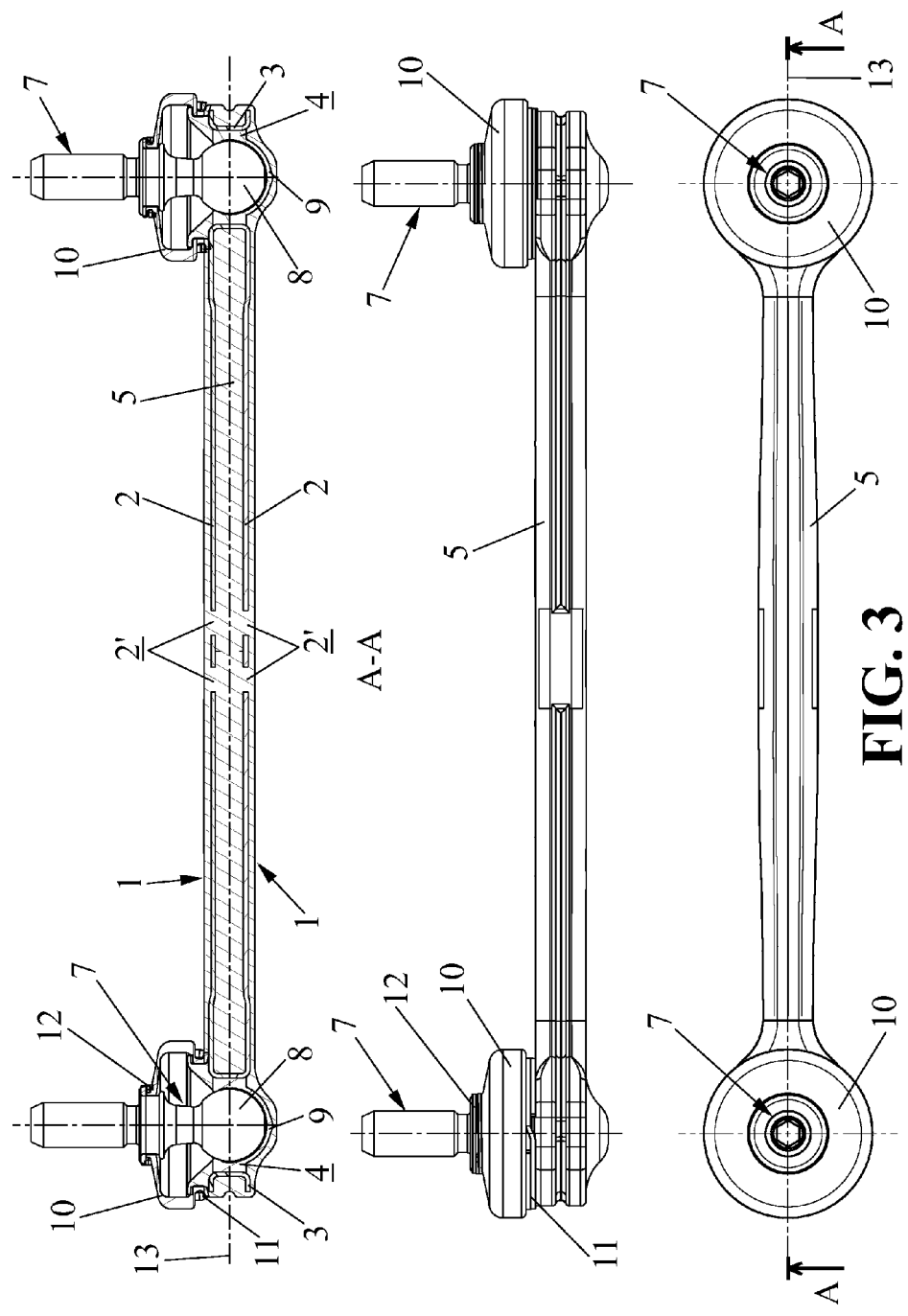
FIG. 3 shows three views, plan view, elevational view and longitudinal section view, of the stabilizer of the subject matter depicted in FIGS. 1 and 2.
Figure 4:
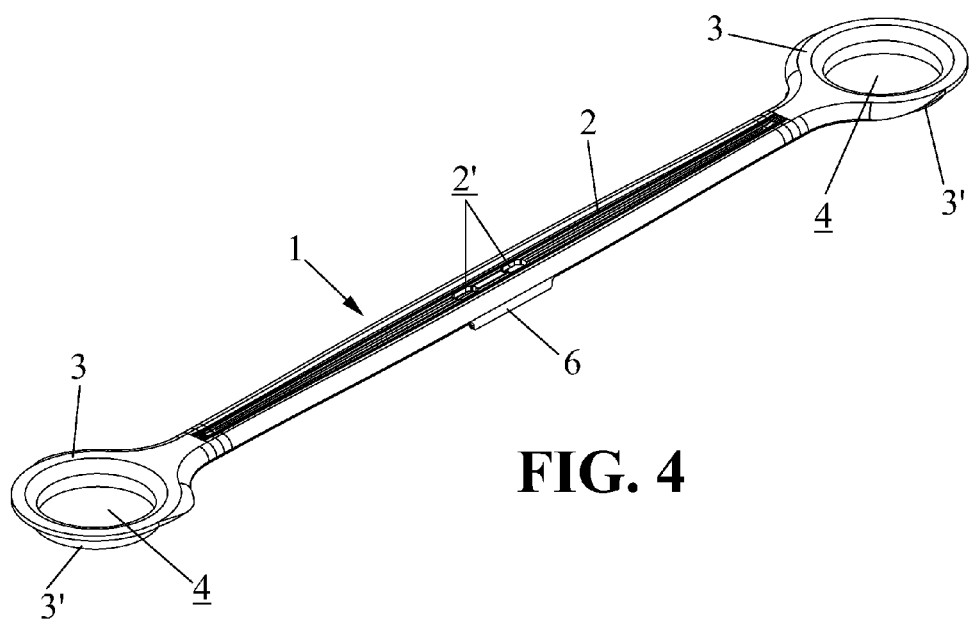
FIG. 4 shows a perspective view of one of the two parts forming the metal frame of the stabilizer of the disclosure.
Figure 5:
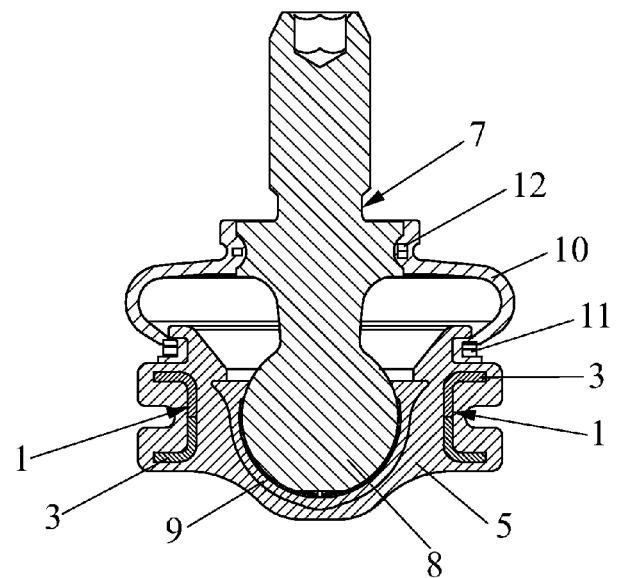
FIG. 5 shows a cross-section view of one end of the stabilizer with an articulation element, in which the arrangement of the seat and the dust seal and of the corresponding rings and the overmolded body can be seen.
Figure 6:
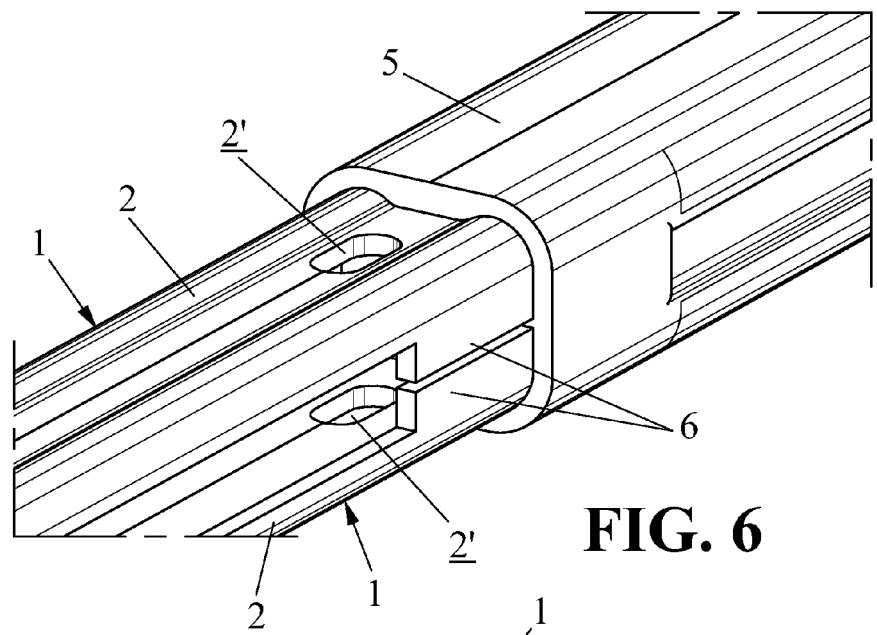
FIG. 6 shows a perspective view of a detail of the central sector of the stabilizer in which the overmolded body has been partially removed to better show the parts forming the metal frame.
Figure 7:
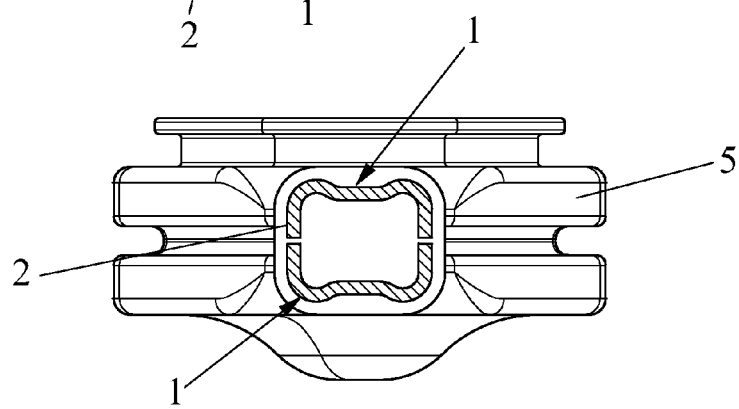
FIG. 7 shows a cross-section view of the central sector of the stabilizer, where the complete coating of the metal frame by part of the overmolded body can be seen.
Figure 8:
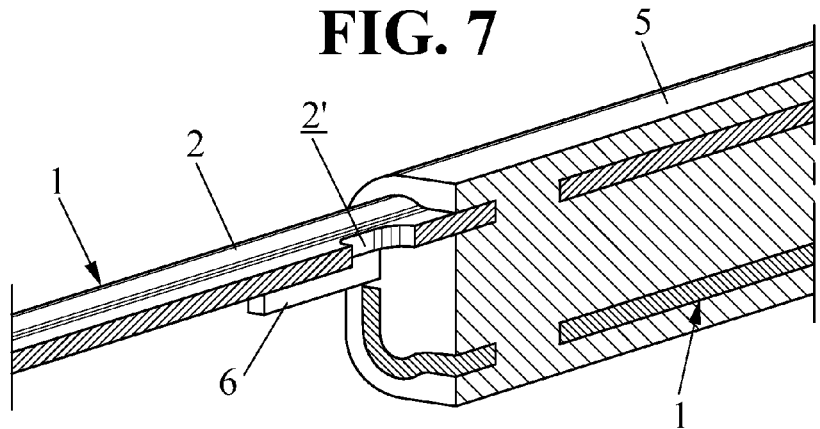
FIG. 8 shows a longitudinal and cross-section view of the detail depicted in FIG. 6.
Figure 9:
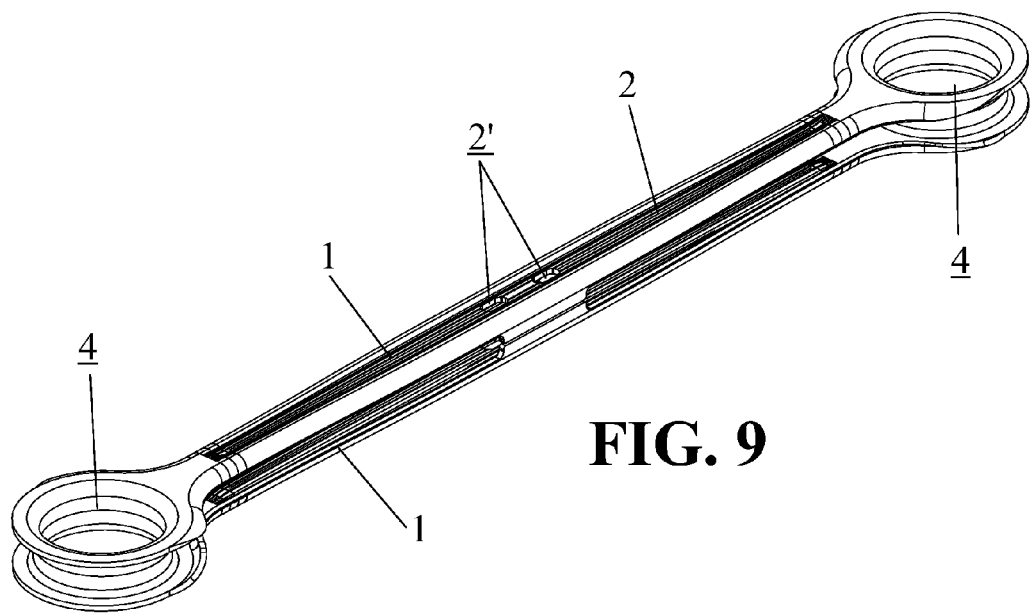
FIG. 9 shows a perspective view of an embodiment of the frame formed by the two opposing metal parts of the stabilizer of the disclosure.
Figure 10:
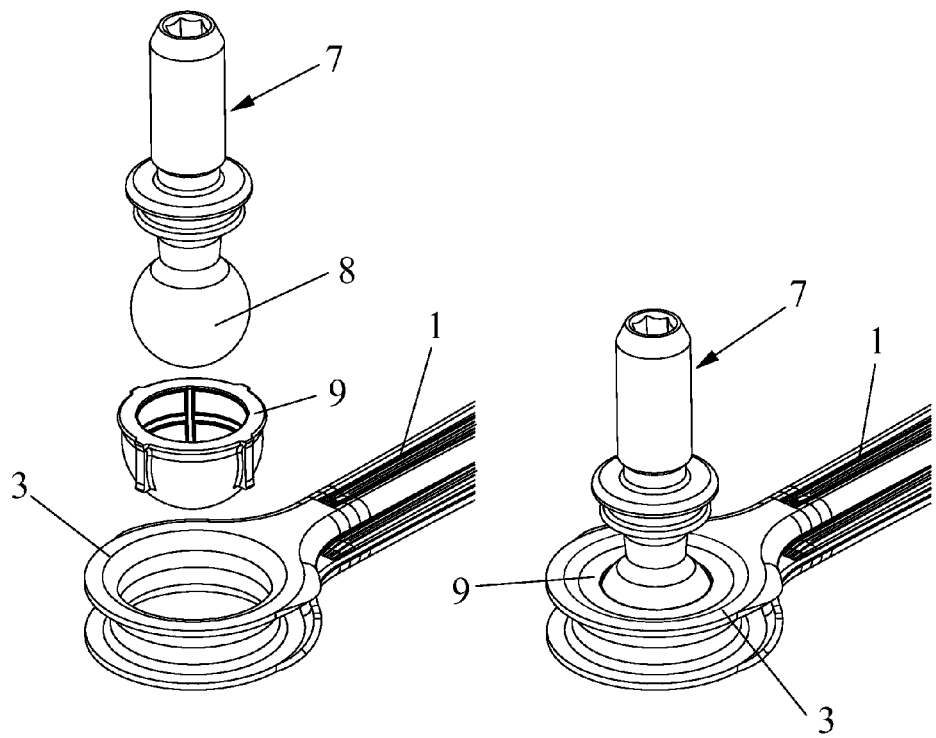
FIG. 10 shows two perspective views, an exploded perspective view and a perspective view in the assembly position, of the coupling of the ball joint at the end of the frame, including the seat.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In view of the discussed figures it can be seen how in one of the possible embodiments of the subject matter of the present disclosure, the stabilizer for vehicle suspension proposed by the disclosure comprises a longitudinal body having two ends (3) and a central sector (2), having a hole (4) at each end (3) wherein there is housed a ball joint (7) or articulation element.

The longitudinal body is formed by a metal frame embedded in polymer material. The metal frame is in turn made up of two identical metal parts (1) which are arranged opposite one another and kept attached by means of an overmolded plastic body (5) preventing the separation of the parts (1).

Each part (1) also comprises at least one central hole (2'), though preferably it has two, located in the central sector (2), where the central sector (2) of the parts (1) is hollow, allowing the passage of the material of the overmolded body (5) to fill the inside of the central sectors (2) of the opposing parts (1).

Each part (1) of the frame comprises two tabs (6) in the central sector (2) which are opposing when the two parts (1) are positioned, such that the two tabs (6) in each part (1) are located in opposition on each side and facing the open side, which allows contacting with the tabs (6) of the complementary part (1) that is arranged opposite to obtain the stabilizer, prior to injecting the overmolded body (5). The inner supports or rims (3') comprised in the ends (3) of the metal parts (1) are also in contact in said opposing position, being at the same level as the tabs (6), whereby achieving greater stability of the stabilizer and greater ease in obtaining it because clearances and movement of the metal parts (1) while injecting the overmolded body (5) are prevented.

The stabilizer also comprises a seat (9) or a housing element in correspondence with each ball joint (7) having a spherical inner surface suitable for housing the spherical portion (8) of the ball joint (7).

According to one embodiment of the disclosure the central sector (2) of the parts (1) is slender and the holes (4) of the ends are circular, being concentric to the outer profile of the ends (3) which is also mostly circular. The axes of the two holes (4) of the ends (3) are also positioned perpendicular to the longitudinal axis (13) of the straight sector (2) of each part (1), which is symmetrical with respect to the longitudinal axis and is substantially planar.

It is also contemplated that the stabilizer comprises at least one dust seal (10) or leak-tight element located at one end (3) suitable for protecting the spherical element (8) of the ball joint (7), with the corresponding rings (11,12) or elements for fixing it.

It is contemplated that each metal part (1) has a plurality of holes so that when the polymer is overmolded the attachment between the two metal parts (1) is more robust. Moment of inertia in that transverse area is lost due to the perforation of the metal part. To compensate for this phenomenon, it is contemplated that each metal part (1) has central tabs (6) in that area to prevent this loss, although the arrangement of tabs (6) in the central portion (2) of each of the metal parts (1) forming the frame is contemplated independently of the holes. The purpose of these tabs (6) is to weld both metal parts (1) in that central area (2) to facilitate the assembly and make the stabilizer more robust.

Figure 13:
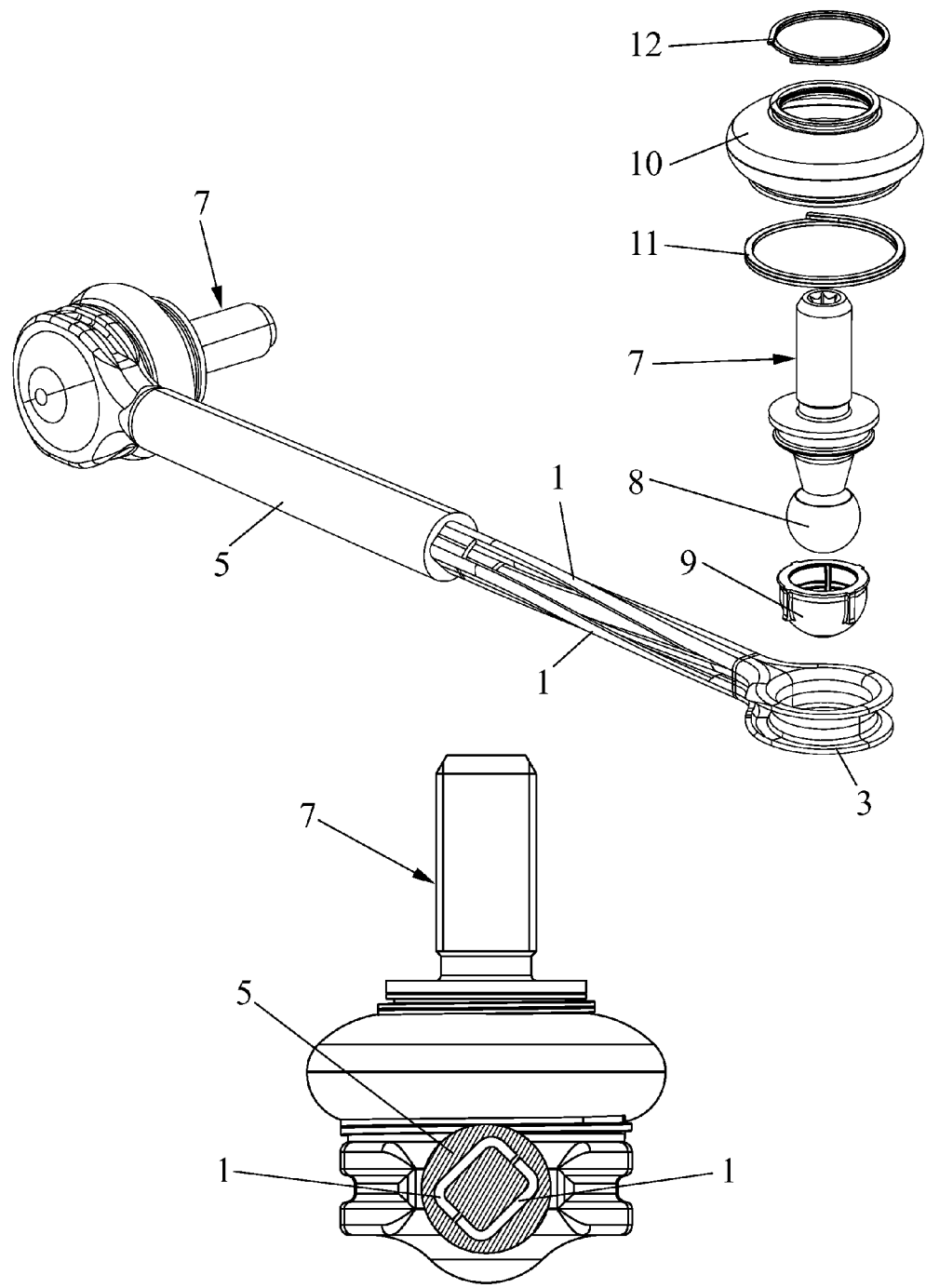
FIG. 13 shows a schematic perspective view, including one half without the overmolded body and with the ball joint elements depicted in exploded view, and a section view like that of FIG. 12, of an embodiment variant, in which the cross-section view of the central sector of the metal parts is rotated according to its own longitudinal axis.
Figure 14:
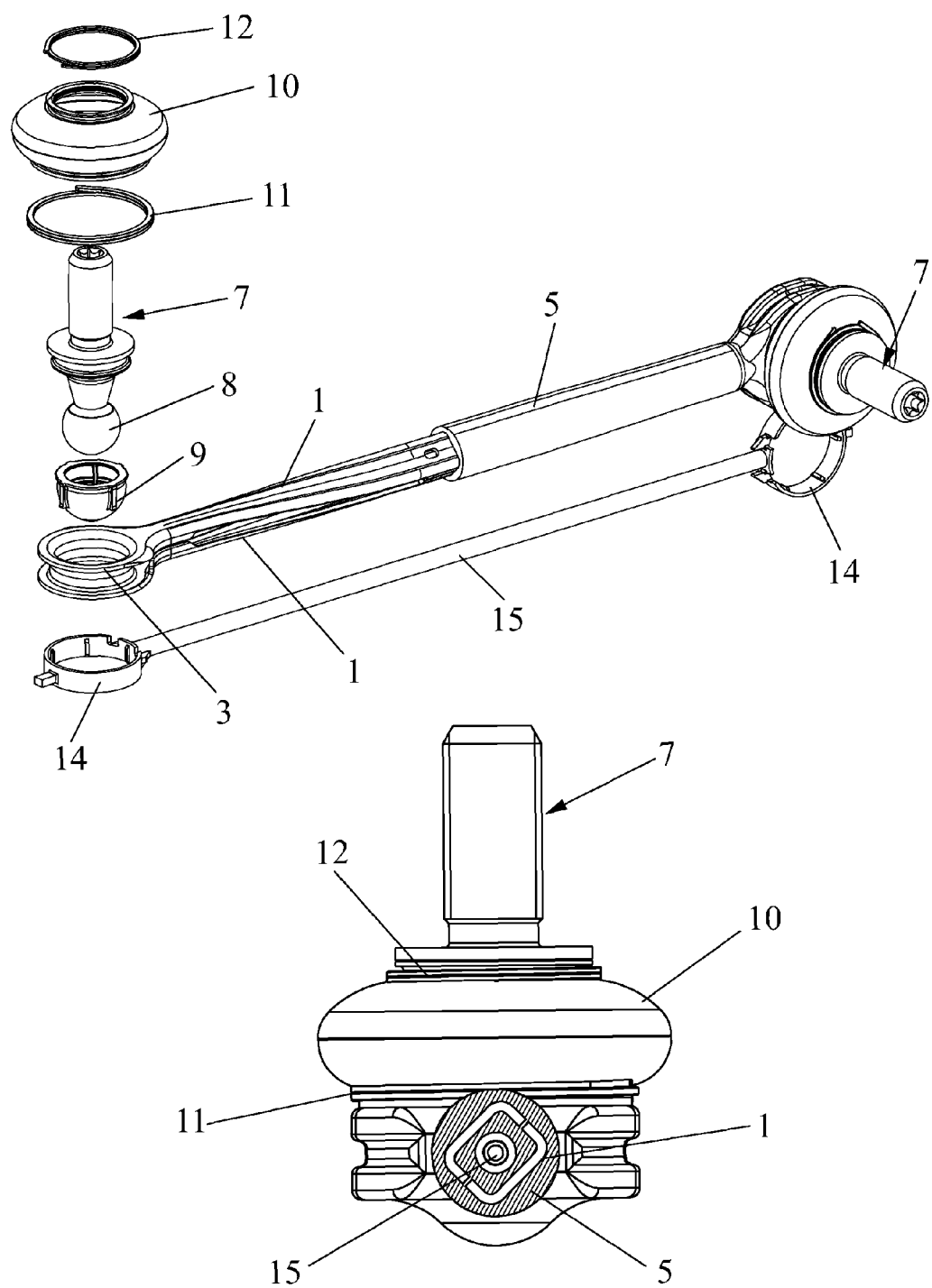
FIG. 14 shows a view like that of FIG. 13 of an embodiment variant comprising a plastic tube attached to two end rings to facilitate assembling the metal parts.
Figure 15:
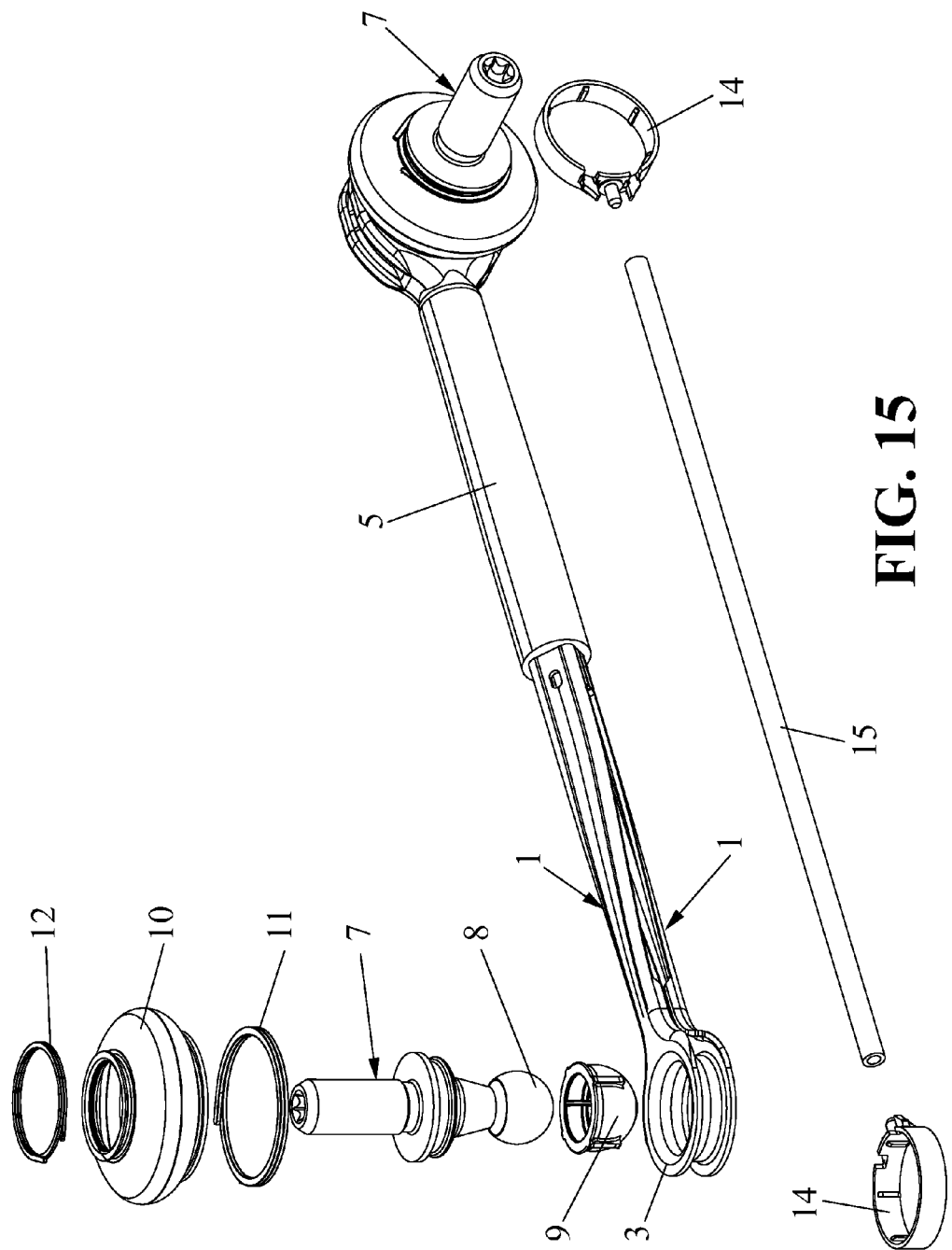
FIG. 15 shows a perspective view of the embodiment depicted in FIG. 14, where the rotation which the section of the metal frame experiences such that the ends of the metal parts are oriented with respect to one another at 90° can be seen, and where the rings separate from the inner reinforcing plastic tube have also been depicted.
Figure 16:
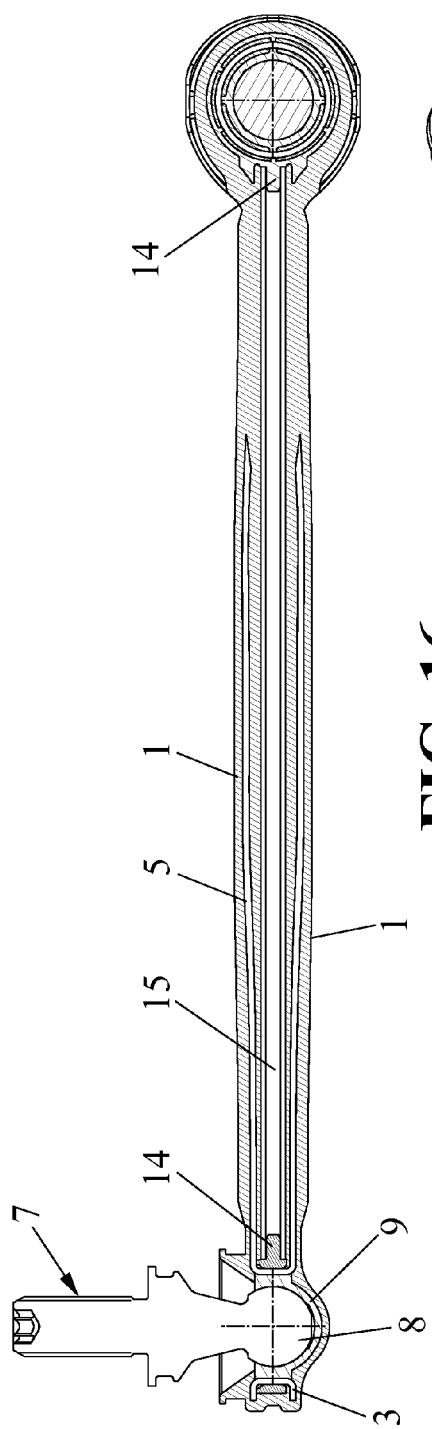
FIG. 16 shows a longitudinal section of the embodiment depicted in FIGS. 14 and 15, where the tube already attached to the rings by means of the locking of protrusions or pivots comprised by the rings in the hollow interior of the tube has been depicted.
Figure 17:
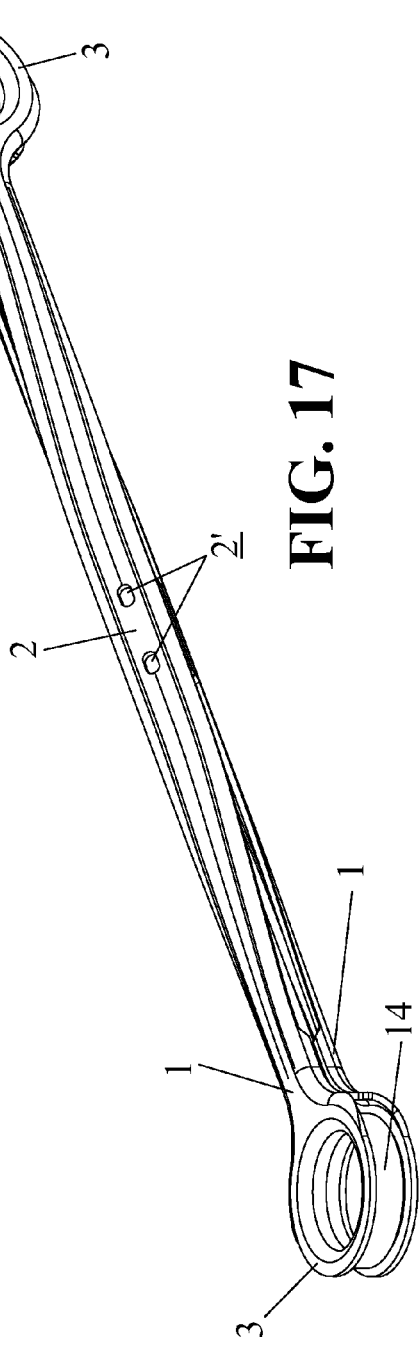
FIG. 17 shows a perspective view of the metal frame corresponding to the embodiment depicted in FIGS. 14 to 16, where the arrangement of the rings externally bracing the ends can be seen.

As depicted in FIGS. 13 and 14, it is also contemplated that the orientation of the axes of the holes (4) of the ends (3) of the stabilizer are oriented with respect to one another between 0° and 90°. Due to the rotation occurring in the metal frame, it is contemplated that the section of the stabilizer is circular, instead of a section of the disclosure in which the geometry of the section is H- or I-shaped, which simplifies the injection process.

Symmetrically welding both metal parts (1) in the area of the spherical joint (7) is contemplated independently of the foregoing to improve the assembly and robustness of the assembly.

As depicted in FIG. 14, the possibility that the stabilizer comprises a plastic tube (15) introduced between both metal parts (1) is contemplated. The inclusion of the tube (15) improves the injection process in addition to saving injected material. The tube (15) must be closed at its ends.

It is also contemplated that the stabilizer comprises two plastic rings (14) bracing the articulations (7), being externally located at the end (3) of each metal part (1). The introduction of the rings (14) facilitates the assembly of the two metal parts (1) with one another. As can be seen in FIG. 14, it is contemplated that the tube (15) and the two rings (14) are attached forming a sub-assembly.

Figure 18:
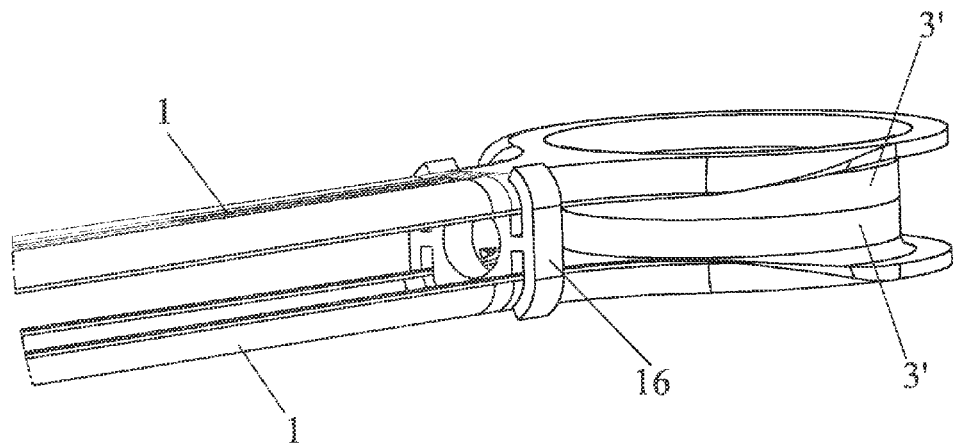
FIG. 18 shows a perspective view of a detail of an end of one variant of the stabilizer of the disclosure comprising a clip for linking the metal bodies at each end prior to injecting the overmolded body, and the contact occurring, as in all the embodiments, between the inner supports which the ends of the metal parts have when said parts are opposite one another to obtain the stabilizer of the disclosure can be seen.
Figure 19:
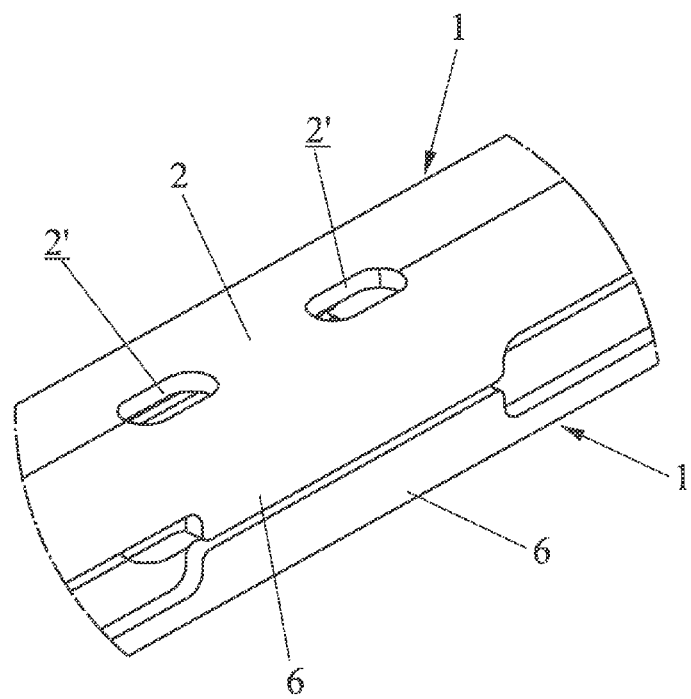
FIG. 19 shows a perspective view of a detail in which the contact between the tabs of the metal parts when said parts are arranged opposite one another to obtain the stabilizer of the disclosure can be seen.

As depicted in FIG. 18, attaching both metal parts (1) of the frame with at least one clip (16) located at their ends is contemplated, thereby aiding in the assembly of the frame and in the overmolding process.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Any schematic flow chart diagrams included herein are generally set forth as logical flow chart diagrams. As such, the depicted order and labeled steps are indicative of one embodiment of the presented apparatus, system, or method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A stabilizer for vehicle suspension, comprising a longitudinal polymeric body with a metal frame having two ends and a straight sector, having a hole at each end wherein there is housed a ball joint, characterized in that the frame is formed from two metal parts having an open section which are arranged opposite one another on their open sections, the straight sector of each part comprising two tabs located in opposition on each side and facing the open section, a distal edge of each tab of one metal part facing a distal edge of the opposing tab of the other metal part, and the ends comprising rims such that the two opposing parts on the tabs and on the rims and are embedded in an overmolded body, which externally coats them and fills the inner space defined by the two opposing metal parts.

2. The stabilizer according to claim 1, wherein each part comprises at least one central hole located in the straight sector, which enables being filled with plastic material of the overmolded body improving the mechanical behavior of the assembly.

3. The stabilizer according to claim 1, wherein the straight sector of the parts is slender and the holes of the ends are circular, being concentric to the outer profile of the ends which is also mostly circular.

4. The stabilizer according to claim 3, wherein the axes of the two holes of the ends are positioned perpendicular to the longitudinal axis of the straight sector of each part.

5. The stabilizer according to claim 4, wherein each part is symmetrical with respect to the longitudinal axis.

6. The stabilizer according to claim 1, wherein the parts are substantially planar and can be obtained by means of press forming.

7. The stabilizer according to claim 1, wherein the orientation of the axes of the holes of the ends of the stabilizer are oriented with respect to one another between 0° and 90°.

8. The stabilizer according to claim 7, wherein the longitudinal polymeric body of the stabilizer has a circular cross-sectional shape.

9. The stabilizer according to claim 1, comprising a plastic tube introduced between both metal parts, where each end of the tube is attached to a plastic ring bracing the end of each metal part.

10. The stabilizer according to claim 1, comprising at least one clip joining the ends of the metal parts.

11. A suspension system comprising a stabilizer comprising a longitudinal polymeric body with a metal frame having two ends and a central sector, having a hole at each end wherein there is housed a ball joint, characterized in that the frame is formed from two metal parts having an open section which are arranged opposite one another on their open sections, the central sector of each part comprising two tabs located in opposition on each side and facing the open section, a distal edge of each tab of one metal part facing a distal edge of the opposing tab of the other metal part, and the ends comprising rims such that the two opposing parts rest on the tabs and on the rims and are embedded in an overmolded body, which externally coats them and fills the inner space defined by the two opposing metal parts.

12. A vehicle comprising a stabilizer comprising a longitudinal polymeric body with a metal frame having two ends and a central sector, having a hole at each end wherein there is housed a ball joint, characterized in that the frame is formed from two metal parts having an open section which are arranged opposite one another on their open sections, the central sector of each part comprising two tabs located in opposition on each side and facing the open section, a distal edge of each tab of one metal part facing a distal edge of the opposing tab of the other metal part, and the ends comprising rims such that the two opposing parts rest on the tabs and on the rims and are embedded in an overmolded body, which externally coats them and fills the inner space defined by the two opposing metal parts.

13. The vehicle according to claim 12, wherein the ball joint is linked to a wheel of the vehicle and the ball joint is articulated to a frame of the vehicle.

* * * * *